United States Patent
Adams et al.

(10) Patent No.: US 10,574,451 B2
(45) Date of Patent: Feb. 25, 2020

(54) METHOD AND APPARATUS FOR PERFECT FORWARD SECRECY USING DETERMINISTIC HIERARCHY

(71) Applicant: Bank of America Corporation, Charlotte, NC (US)

(72) Inventors: Amanda Jane Adams, Flintshire (GB); Ben Lightowler, Sandhurst (GB)

(73) Assignee: Bank of America Corporation, Charlotte, NC (US)

( * ) Notice: Subject to any disclaimer, the term of this patent is extended or adjusted under 35 U.S.C. 154(b) by 292 days.

(21) Appl. No.: 15/788,743

(22) Filed: Oct. 19, 2017

(65) Prior Publication Data
US 2019/0123897 A1   Apr. 25, 2019

(51) Int. Cl.
| H04L 9/08 | (2006.01) |
|---|---|
| H04L 9/06 | (2006.01) |
| H04L 9/30 | (2006.01) |
| H04L 9/14 | (2006.01) |

(52) U.S. Cl.
CPC .......... *H04L 9/0861* (2013.01); *H04L 9/0643* (2013.01); *H04L 9/083* (2013.01); *H04L 9/0841* (2013.01); *H04L 9/0894* (2013.01); *H04L 9/14* (2013.01); *H04L 9/30* (2013.01)

(58) Field of Classification Search
CPC . H04L 9/08; H04L 9/06; H04L 9/0861; H04L 9/0841; H04L 9/14; H04L 9/0894; H04L 9/30; H04L 9/0643; H04L 9/083
USPC ........ 380/277, 281–282, 284; 713/168, 171; 709/203, 208
See application file for complete search history.

(56) References Cited

U.S. PATENT DOCUMENTS

| 5,724,425 A | * | 3/1998 | Chang | G06F 21/125 380/30 |
|---|---|---|---|---|
| 6,081,598 A | * | 6/2000 | Dai | H04L 9/302 380/28 |
| 7,013,389 B1 | * | 3/2006 | Srivastava | H04L 9/0822 713/163 |
| 7,908,482 B2 | | 3/2011 | Lauter et al. | |
| 8,190,895 B2 | | 5/2012 | Lauter et al. | |
| 8,670,560 B2 | | 3/2014 | Cheddad et al. | |

(Continued)

OTHER PUBLICATIONS

"Perfect Forward Secrecy—An Introduction," https://scotthelme.co.uk/perfect-forward-secrecy/, May 10, 2014.

(Continued)

*Primary Examiner* — Khang Do
*Assistant Examiner* — Khalid M Almaghayreh
(74) *Attorney, Agent, or Firm* — Weiss & Arons LLP; Michael A. Springs, Esq.

(57) ABSTRACT

Method and apparatus for a system to communicate via perfect forward secrecy. A deterministic hierarchy is used to generate public and private keys, offline, on distinct devices, for use with asymmetrical cryptography over an unsecure medium. Because each private key is not transmitted over the unsecure medium, but must be used to de-encrypt the communications, it is very difficult for man-in-the-middle attacks to de-encrypt the communications. Because each private key is generated according to a deterministic hierarchy, a master entity can recreate the private keys and passively monitor the communications while maintaining perfect forward secrecy.

17 Claims, 6 Drawing Sheets

(56) References Cited

U.S. PATENT DOCUMENTS

| | | | |
|---|---|---|---|
| 8,837,741 B2 | 9/2014 | Hawkes et al. | |
| 9,078,126 B2* | 7/2015 | Yi | H04L 9/0841 |
| 9,385,864 B2 | 7/2016 | Pahl et al. | |
| 9,450,950 B2 | 9/2016 | Pahl et al. | |
| 9,531,685 B2 | 12/2016 | Gero et al. | |
| 9,553,856 B2 | 1/2017 | Pahl et al. | |
| 9,584,318 B1 | 2/2017 | Yang et al. | |
| 9,698,976 B1* | 7/2017 | Statica | H04L 9/0891 |
| 10,129,223 B1* | 11/2018 | Bhattacharyya | H04L 9/14 |
| 10,412,063 B1* | 9/2019 | Mandich | H04L 9/0838 |
| 2005/0251680 A1* | 11/2005 | Brown | H04L 63/061 |
| | | | 713/171 |
| 2011/0116628 A1* | 5/2011 | Wack | H04L 9/0869 |
| | | | 380/44 |
| 2013/0039486 A1* | 2/2013 | Itoh | H04L 9/3066 |
| | | | 380/28 |
| 2015/0067329 A1* | 3/2015 | Ben Saied | H04L 9/0838 |
| | | | 713/168 |
| 2015/0106624 A1* | 4/2015 | Gero | H04L 9/0643 |
| | | | 713/171 |
| 2017/0142153 A1 | 5/2017 | Yang et al. | |
| 2018/0323966 A1* | 11/2018 | Kanagaraj | H04L 9/0643 |
| 2018/0337782 A1* | 11/2018 | Wu | H04L 9/3268 |

OTHER PUBLICATIONS

"Best Practices for Monitoring Encrypted Data," https://www.ixiacom.com/sites/default/files/2017-05/915-8155-01-5071%20WP%20Best%20Practices%20for%20Monitoring%20Encrypted%20Data.pdf, Retrieved on Jul. 20, 2017.

"Introduction to Perfect Forward Secrecy," https://www.ciso-central.org/transport-layer-security/perfect-forward-secrecy, Available as of Feb. 23, 2017.

* cited by examiner

METHOD AND APPARATUS FOR PERFECT FORWARD SECRECY USING DETERMINISTIC HIERARCHY

FIELD OF TECHNOLOGY

This disclosure relates to enhancing the performance of a computer system. Specifically, the disclosure relates to enhancing the performance of secure communications via the use of cryptographic session key derivations and master key secrecy.

BACKGROUND OF THE DISCLOSURE

In cryptography, perfect forward secrecy is a desired property for secure communications between parties. Perfect forward secrecy is present in a system if the compromise of a data set (such as a key) used to de-encrypt an intercepted communication at a future time does not also result in the ability to de-encrypt previously saved intercepted past communications. Prior art attempts to implement perfect forward secrecy have relied upon asymmetrical cryptography in which the de-encryption relies upon each of the parties possessing a public key (a data set known by both parties) and a private key (a data set only known to one party). Unfortunately, these systems often require the unwanted trade-off of inadequate security capabilities versus onerous computational costs. As a result, there is clear utility in and benefit from, novel methods and apparatuses for securely and efficiently implementing perfect forward secrecy.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

For the purposes of this disclosure, like reference numerals in the figures shall refer to like features unless otherwise indicated. The drawings are only an exemplification of the principles of the invention and are not intended to limit the disclosure to the particular embodiments illustrated.

BRIEF SUMMARY

Figure 1:
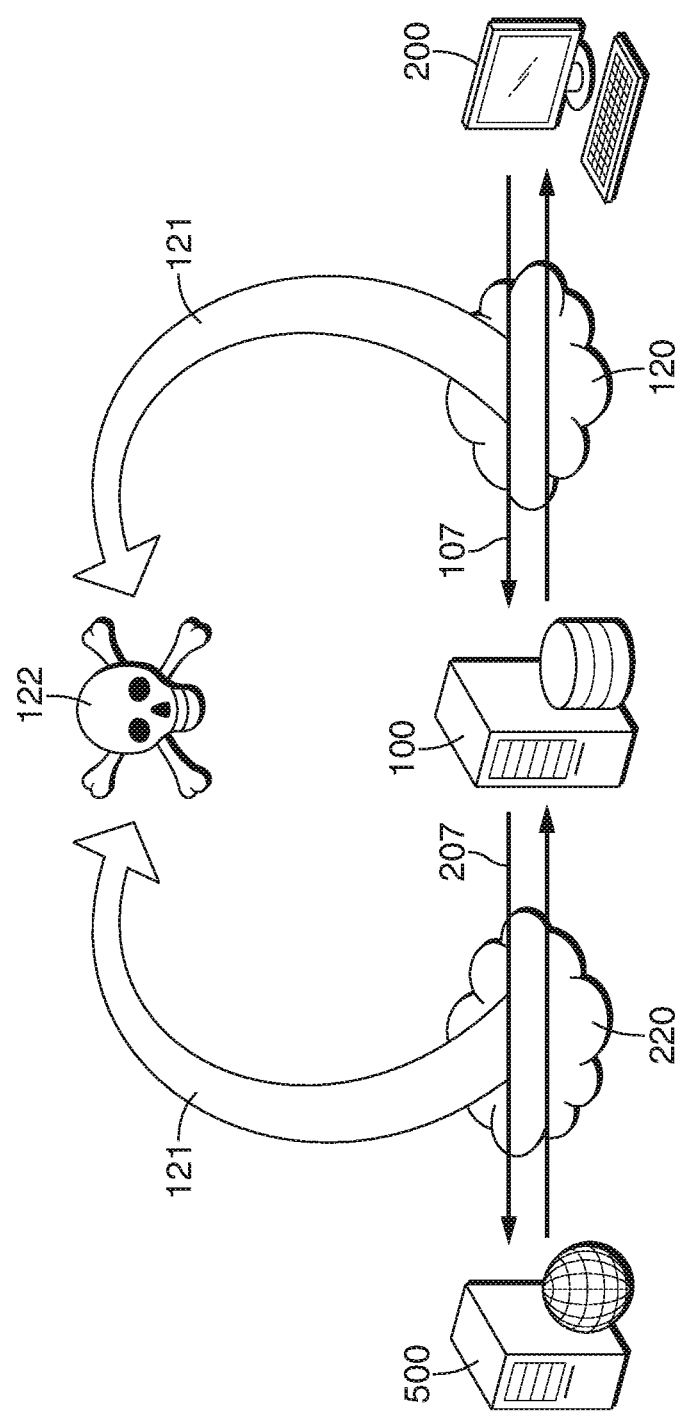
FIG. 1 is an illustrative first drawing illustrating perfect forward secrecy in a proxy server configuration.

To satisfy the long-felt but unsolved needs identified above, at least one embodiment is directed toward an apparatus for perfect forward secrecy. The apparatus may comprise a plurality of devices. The plurality of devices may include a master device. All the other devices included in the plurality of devices may be descendent devices.

Each of the descendant devices may be configured to: receive a chain string cipher-text from its immediate ancestor device. Each of the descendent devices may also be configured to generate a private key, a public key, and a second chain string cipher-text, and increment an index value, by applying a pre-installed algorithm to the received private key cipher-text. Embedded within the generated second chain string cipher-text may be the incremented index value. The descendant devices may be configured to transmit communications over an unsecure medium via asymmetric cryptography. The public keys and incremented index value may accompany communications over the unsecure medium. The private keys may be used to de-encrypt the communications offline.

The master device may be an ancestor to all the descendent devices. The master device may also be configured to:
 (i) apply a first algorithm to an initial randomly generated string seed value to generate a master private key, a master public key, an initial index value, and a primary chain string cipher-text, wherein, embedded within the primary chain string cipher-text is the index value;
 (ii) transmit the primary chain string cipher-text to a descendant entity;
 (iii) intercept a communication over an unsecure medium transmitted by a transmitting descendent entity;
 (iv) recreate the private key of the transmitting descendent entity by:
  (a) retrieving the incremented index value from the communication,
  (b) retrieving, from a data structure, every algorithm associated with index values ranging from the initial index value up to the retrieved index value; and
  (c) recursively applying each of the retrieved algorithms on the seed values; and
 (v) passively de-encrypting the intercepted communication with the recreated private key.

The index value may be embedded within the first chain string cipher-text.

The first chain string cipher-text may be installed on the descendent entity via transmission over an unsecure medium.

The seed value may be created with a random number generator.

The seed value may be created with a random number generator selected from the group consisting of: Blum Blum Shub, Blum-Micali algorithm, Complementary-multiply-with-carry, Counter-based random number generator (CBRNG), Inversive congruential generator, ISAAC (cipher), KISS (algorithm), Lagged Fibonacci generator, Linear congruential generator—of historical importance, Linear feedback shift register, Maximal periodic reciprocals, Mersenne Twister, Middle-square method, MIXMAX generator, Multiply-with-carry, Naor-Reingold pseudorandom function, Park-Miller random number generator, PCG, RC4 PRGA, Rule 30, Well equidistributed long-period linear, Wichmann-Hill, Xorshift, Xoroshiro128+, Yarrow, Hardware (true) random number generators (TRNGs), Block ciphers in counter mode, Cryptographic hash function, Stream ciphers, PRNG APIs, Random class in the .NET Framework, Random class in the Java programming language, SecureRandom class in the Java programming language, Random module in the Haskell 98 specifications, Web Crypto API for web browsers, Random number generators that use external entropy, TRaNGen2—Microsoft Windows, CryptGenRandom—Microsoft Windows, Fortuna, Yarrow—Mac OS X and FreeBSD, /dev/random—Linux and Unix, LavaRnd, Lavarand and any combination thereof.

The algorithm may be one item selected from the group consisting of: SHA-224, SHA-256, SHA-384, SHA-512, a hash function, a block cipher routine, implementing an XOR function or a more detailed secret key encryption algorithm, such as Data Encryption Standard (DES), Triple-DES (3DES), DESX, Advanced Encryption Standard (AES), CAST-128, CAST-256, International Data Encryption Algorithm (IDEA), Rivest Ciphers 1-6 (RC1-RC-6), Blowfish, Twofish, Camellia, MISTY1, Secure And Fast Encryption Routine (SAFER), KASUMI, SEED, Skipjack, RSA, Diffie-Hellman key exchange, Digital Signature Algorithm (DSA), ElGamel, Elliptical Curve Crptography (ECC), Public-Key Crytography Standards (PKCS), Cramer-Shoup, Key Exchange Algorithm (KEA), LUC and any combination thereof.

The data structure may be one item selected form the group consisting of a: list, array, associative array, multimap, set, bag, multiset, stack, queue, double ended queue, priority queue, tree, graph and any combination thereof.

The algorithm may produce a hash text.

The public and private keys may be strings parsed from different sections of a hash generated by the algorithm.

The index value may comprise data including a value which mathematically corresponds with the number of devices ancestor to the generating device.

The index value may comprise data corresponding to how many devices with equal numbers of ancestor devices the generating device has.

The master device may be further configured transmit communications over an unsecure medium via asymmetric cryptography using the recreated public and private keys.

At least one embodiment is directed toward a method for communicating with perfect forward secrecy. The method may comprise on a master device: (i) randomly generating a seed value; (ii) creating a hash string by operating on the seed value with a SHA512 algorithm; (iii) parsing a first 256 bits of the hash string to define a parent chain string; (iv) parsing a second 256 bits of the hash string to define a private key and a public key; and creating an initial index value.

The method may further comprise on a descendent device:

(i) Receiving a chain string and an index value from a device immediately ancestral to the descendant device. The chain string and the index value may be the respective parent chain string or a chain string descended therefrom. The chain string may include an initial index value or an index value descended therefrom.

(ii) Creating a descendant hash string by operating on the received chain string with a SHA512 algorithm.

(iii) Parsing a first 256 bits of the descendant hash string to define a transmitted chain string.

(iv) Parsing a first portion and a second portion of a second 256 bits of the descendant hash string to define respectively, a private key and a public key.

(v) Incrementing the index value.

(vi) Optionally transmitting the transmitted hash string and incremented an index value to a device immediately further descendant to the descendent device.

A descendant device may communicate over an unsecure medium via asymmetric cryptography. The asymmetric cryptography may comprise a public key and an incremented index value accompanying a communication transmitted over the unsecure medium. The asymmetric cryptography may comprise a private key is used to de-encrypt the communications offline.

The master device may de-encrypt the communication of a descendant device by recursively applying a SHA512 algorithm and appropriately parsing off keys from the seed value for a number of times equal to the index value of the communication.

The first and second 256 bits may each be a different character string beginning from a point equal to a bit location displaced from the end or beginning of the hash string selected from the range of 0 to 100% of the hash string length, and wrapping around again to the beginning of the hash string if the distance from the bit location to the end of the hash string is less than 256 bits.

The master device may be a TLS server.

The at least one device may be a client device of a client-server network architecture.

The index value may be a string with a length of at least 32 bits.

The SHA512 algorithm may operate on the hash value to generate a replacement hash value after each communication session.

DETAILED DESCRIPTION OF THE DISCLOSURE

Definitions

"Device" means any logic using electronic apparatus used to transmit user input and process, store, transmit, and/or output data, and includes but is not limited to, personal computers, business computers, laptop computers, tablet devices, computer networks, software applications, web browsers, SMS devices, SMS software, email devices, email software, electronic data devices, cell phones, cell phone applications, firmware, websites, cloud-based processing, internet routers, web servers, computer terminals, PDAs, any component thereof, any device integrated with any of the aforementioned, and any combination thereof.

"Encode" means, in addition to its ordinary language meaning, the process of respectively encrypting or de-encrypting a plain-text or cipher-text version of a data set into the corresponding cipher-text or plain-text version of the data set.

"Cipher-text" means a data set which has been encrypted by an algorithm into a format designed to render the data set unintelligible to a human or computer except for those in possession of an algorithm or a needed key used thereby, capable of de-encrypting the data set.

"Offline" means application of logic on a data set by a processor in such a manner that the data set and the logic are not transmitted over an unsecure medium. Offline is the opposite of online.

"Plain-text" means a data set which is readily understandable by either a human or computer.

"Key" means a data set, whose presence, when a cryptographic algorithm is operating on a targeted data set, determines the specific functional output of the algorithm. Such output includes the encryption of a plain-text version of the target data set into a cipher-text version of the target data set as well as the de-encryption of a cipher-text version of the target data set into a plain-text version of the target data set.

"Hash" or "Hash Function" means an algorithm which converts a targeted data set into an alphanumeric string of a pre-determined fixed size. Hashes are of importance in cryptography because creating the string requires very little computational power, the strings tend to be highly unique even for closely related targeted data sets, and it is very difficult for intercepting third parties to derive a targeted data set from the string.

"SHA-Algorithm" refers to any one of the hash-using algorithms selected from the list consisting of SHA-224, SHA-256, SHA-384, and SHA-512.

Embodiments

In an embodiment, perfect forward communication and passive monitoring thereof is accomplished by using a recursive nested cryptographic algorithm according to hierarchical deterministic protocols.

With the advent of electronic commerce, the need for perfect forward secrecy is ever more important. This is because much of modern e-commerce occurs via communication transmissions transiting through platforms and medium especially prone to so-called "man-in-the-middle" attacks. In a man-in-the-middle attack, an attacker intercepts communication between parties who mistakenly believe they are sharing a private communication link. The attacker can then relay the intercepted communication between the parties to eavesdrop while maintaining the parties' mistaken belief. Even worse, the attacker can alter the intercepted communication between the parties to fraudulently induce a desired disclosure, action, or statement by one or both of the parties.

A first step towards protection against man-in-the-middle attacks is encryption of communications. This is typically done by applying some algorithm, known to all the intended parties of the communication, to a plain-text version of the message before sending it in cipher-text format to the intended recipient. Unfortunately, mere encryption of communications is not a sufficient protection against man-in-the-middle attacks because, if at any time in the future, the de-encryption code is discovered by the attacker, all previously saved communications in cipher-text format can be de-encrypted by the attacker into plain-text versions. In addition, numerous brute force methods exist for de-encrypting cipher-text communications, especially when individual codes are used multiple times to de-encrypt multiple communications.

As a result, keys are often used by all sides of a communication to both authenticate the sender and recipient and to encode the communication. However, because keys themselves are only as secure as the device that stores them, modern encryption protocols rely on the use of asymmetric cryptography and session keys.

In asymmetric cryptography (including but not limited to a Diffie-Hellman key exchange), each user has two keys, one is a public key known to the other party and one is a private key only known by that party. A sender transmits an encoded message which includes the sender's public key to authenticate the sender. The message however, can only be de-encrypted offline with the recipient's private key. So long as each of the parties has their own public key and private key, the parties can share communications that can only be opened by the parties. Because the transmitted communications never include a private key, it is extremely unlikely for a man-in-the-middle attacker to obtain a private key. However, because the communications cannot be de-encrypted without the private key, man-in-the-middle attacks are harder to perform.

Session keys are keys that are generated for one session, a specific instance of communication (such as the release of a single data burst or data packet, communication of a specific time duration, or a specific number of replies/responses) and are then replaced by a different key for the next instance of communication. Replacing the keys each session makes the keys a "moving target" which presents fewer analysis samples an attacker can use to dissect the key portion of the communication. In an embodiment, a session is a communication conducted within a time duration within the range of 0.00001 seconds to 1 year. In an embodiment, a session is a communication having a number of replies/responses within the range of 1 to 1,000,000. In an embodiment, a session is a communication having a total size of between 1 byte and 1,000,000,000 terabytes.

In an embodiment, multiple public session keys and private session keys are generated according to a deterministic hierarchy. In a deterministic hierarchy, many descendent items are derived from a single original seed. The original seed is a data set which may be numeric, alphabetic, alphanumeric, or other text-based string. Each descendent item is a highly variable string, but one that can be authenticated using the original seed and an index value. The index value is a data set which contains in it a depth value and may include a breadth value. The depth value indicates how many generations down from the original seed, a particular item is. The breadth value indicates where, in the sequence of generated items, at a given depth, is the item at issue (i.e., a measure of number of siblings). In an embodiment, the index value is simply a running total of the number of descendants or communication sessions.

In an embodiment, as illustrated in FIG. 1, the multiple session keys are implemented according to a proxy server arrangement. In this arrangement, a party in control of a master entity (100) may observe, monitor, limit, block, censor, redact, or otherwise control the transmissions or receptions of a party operating a child entity (200) as it accesses an outside entity (500) (such as a web server or website) over an unsecure medium (120). Representative examples of unsecure medium include but are not limited to one or more of the internet, intranet, within a WIFI network, via a radio or other broadcast or broadband signal transmission, or may be over unsecured wires, circuits, resistors, capacitors, inductors, diodes, transistors microprocessors, logic gates, microchips, silicon chips, optical fibers, hardline network, coaxial cable, and/or dielectric-slab waveguides. Because the communications (107, 207) traverse an unsecure medium (120), there is the ever-present danger of the communications (107, 207) being intercepted (121) by a man-in-the-middle attack launched by an interceptor (122).

In such a proxy server arrangement, the child entity (200) does not directly access the outside entity (500) but instead the master entity (100) relays communications between the two. This is accomplished when both the master entity (100) and the child entity (200) both have the same private key, so they can both encrypt and de-encrypt cipher-text messages transmitted to and from the outside entity (500). This arrangement may be desirable because a business owner is trying to ensure that employees or other substituents do not download malware, do not disclose confidential information, do not break the law, or otherwise do not make use of outside connections in an unwanted manner.

Unfortunately, perfect forward secrecy would appear to be innately contradictory with proxy server arrangements. This is because perfect forward secrecy requires that both the child entity (200) and the master entity (100) simultaneously possess the same randomly generated private keys for each communication session. This is statistically impossible unless the randomly generated private keys are somehow shared. But sharing the keys over the unsecure medium (120) makes them vulnerable to interception. This in fact is the reason why asymmetric cryptography depends upon not transmitting private keys over an unsecure medium (120). So how can the child entity (200) and the master entity (100) both share the same randomly generated value without communicating the random value over the unsecure medium (120)? In an embodiment, this apparent contradiction is resolved though the use of deterministic hierarchy.

The deterministic hierarchy utilizes a known algorithm on a given item (such as a seed or an item derived therefrom) to generate a seemingly random value. An index value resides either embedded somewhere within the generated value or as a coexisting data set accompanying a key. An algorithm is first applied to the seed value but it or another is then applied recursively on each subsequently generated item (children, sibling children, grandchildren, sibling grandchildren, etc. . . . ) to create further items. Any presented item can be validated if one knows the seed value, the sequence of algorithm(s), and the index value which indicates how many of the sequence of algorithms is to be applied in the recursion. Because very large numbers are used in the generation of seed values, without knowledge of all: the seed value, the algorithm(s), and the index value, a valid item cannot be generated or authenticated.

In an embodiment, a single algorithm is used by the system, so starting with the seed value, the private key of any entity will be equal to a sub string of the result of the seed value operated on by the algorithm for the number of times equal to the index value. In an embodiment, multiple different algorithms are used after each other. As a result, to generate the private keys for each increment of the index value, the appropriate algorithm associated with that index value must operate on the previously generated result. In an embodiment, one or more data structures, accessible to or residing within the master entity, has data fields populated with an algorithm identity. Each data field is also associated with a corresponding index value. The data structure may be selected from the group consisting of list, array, associative array, multimap, set, bag, multiset, stack, queue, double ended queue, priority queue, tree, graph, and any combination thereof. In an embodiment, the same or a different algorithm is used to create each subsequent sibling or descendent key.

In at least one embodiment, the keys used in a system are generated via a deterministic hierarchy. A large seed value is generated via a random number generation process. The seed may have between 100-1,000,000 bytes, or more, or less. In a preferred embodiment, the generated seed has 512 bytes. The seed is then run through a known algorithm to produce a chain string. A portion of the algorithm resulting chain string is then defined as the public key, a portion as a private key. Any of the public key, private key, or chain string may be produced by further operation of one or more algorithms. The keys and chain string may be a set number of bytes from one end or another of the adjusted seed or may be derived in any manner from the adjusted seed.

An index value is associated with each of the keys and chain string. The first index value may be generated either at the random number generation state, the algorithm adjustment stage, the first key generation stage and/or the chain string generation stage. In an embodiment, the chain string is long enough to avoid the repetition of a number despite the production of numerous session keys. In an embodiment, the chain string is smaller than, equal to, or larger than 32 bits.

The algorithm may be one or more iterations of one or more items selected from the group consisting of Elliptical Curve Cryptography (ECC), SHA-224, SHA-256, SHA-384, SHA-512, a hash function, a block cipher routine, implementing an XOR function or a more detailed secret key encryption algorithm, such as Data Encryption Standard (DES), Triple-DES (3DES), DESX, Advanced Encryption Standard (AES), CAST-128, CAST-256, International Data Encryption Algorithm (IDEA), Rivest Ciphers 1-6 (RC1-RC-6), Blowfish, Twofish, Camellia, MISTY1, Secure And Fast Encryption Routine (SAFER), KASUMI, SEED, Skipjack, RSA, Digital Signature Algorithm (DSA), ElGamel, Public-Key Crytography Standards (PKCS), Cramer-Shoup, Key Exchange Algorithm (KEA), LUC, and any combination thereof. The received input may be manually created by a human user or automated in any manner. In an embodiment, the random number generator receives an input value and applies an algorithm to the received input.

In an embodiment, the random number generator uses at least one of the one or more iterations of one or more algorithms and or functions selected from the group consisting of: Blum Blum Shub, Blum-Micali algorithm, Complementary-multiply-with-carry, Counter-based random number generator (CBRNG), Inversive congruential generator, ISAAC (cipher), KISS (algorithm), Lagged Fibonacci generator, Linear congruential generator—of historical importance, Linear feedback shift register, Maximal periodic reciprocals, Mersenne Twister, Middle-square method, MIXMAX generator, Multiply-with-carry, Naor-Reingold pseudorandom function, Park-Miller random number generator, PCG, RC4 PRGA, Rule 30, Well equidistributed long-period linear, Wichmann-Hill, Xorshift, Xoroshiro128+, Yarrow, Hardware (true) random number generators (TRNGs), Block ciphers in counter mode, Cryptographic hash function, Stream ciphers, PRNG APIs, Random class in the .NET Framework, Random class in the Java programming language, SecureRandom class in the Java programming language, Random module in the Haskell 98 specifications, Web Crypto API for web browsers, Random number generators that use external entropy, TRaNGen2—Microsoft Windows, CryptGenRandom—Microsoft Windows, Fortuna, Yarrow—Mac OS X and FreeBSD, /dev/random—Linux and Unix, LavaRnd, Lavarand, and any combination thereof.

This process can be illustrated with reference to the example provided according to Table 1.

TABLE 1

| Index Value | Algorithm | Public Key | Private Key |
| --- | --- | --- | --- |
| 0 | Random Number Generator | Left 256 bits | Right 256 bits |
| 1 | SHA-512 | Right 256 bits | Left 256 bits |
| 2 | SHA-512 then right displace each bit location by 5 bits | Left odd 256 bits | Right odd 256 bits |
| 3 | ECC | Left every 3rd 256 bits | Right every 4th 256 bits |
| 4 | SHA-512 | Left odd 256 bits | Right odd 256 bits |

Table 1 illustrates an example data structure accessible to a master entity. The master entity uses a random number generator to create and store a seed value. From that seed value, a sequence of algorithms and key definitions are used to create descendent chain strings and creates public and private keys from specific bit length string subsets of those produced chain strings. If the master entity seeks to de-encrypt a cipher-text communication from a descendant entity, all it needs to do is identify the index value of that descendant entity. The index value may be known to be embedded at a particular bit-location or it may be positioned somewhere within the encrypted cipher-text. With the index number, the private key can be recreated from the seed value.

For example, if a system was utilizing the matrix described in Table 1 and it intercepted a cipher-text communication, the system could use that matrix to de-encrypt the communication. First, the system would need to identify an index number form within the communication. If the master entity identified the index value as 4, the system would perform the following sequential processes to recreate the private key needed to de-encrypt the communication. First, the system would apply to the stored seed value a SHA-512 algorithm. To the result, the system would apply a SHA-512 algorithm, then right displace each bit location by 5 bits, then apply an elliptic curve cryptography algorithm, then apply a SHA-512 algorithm. The result of this sequence of processes is the chain string. Per the data structure, the private key is the 256-bit string formed by the rightmost odd numbered bits of the produced chain string.

Figure 2:
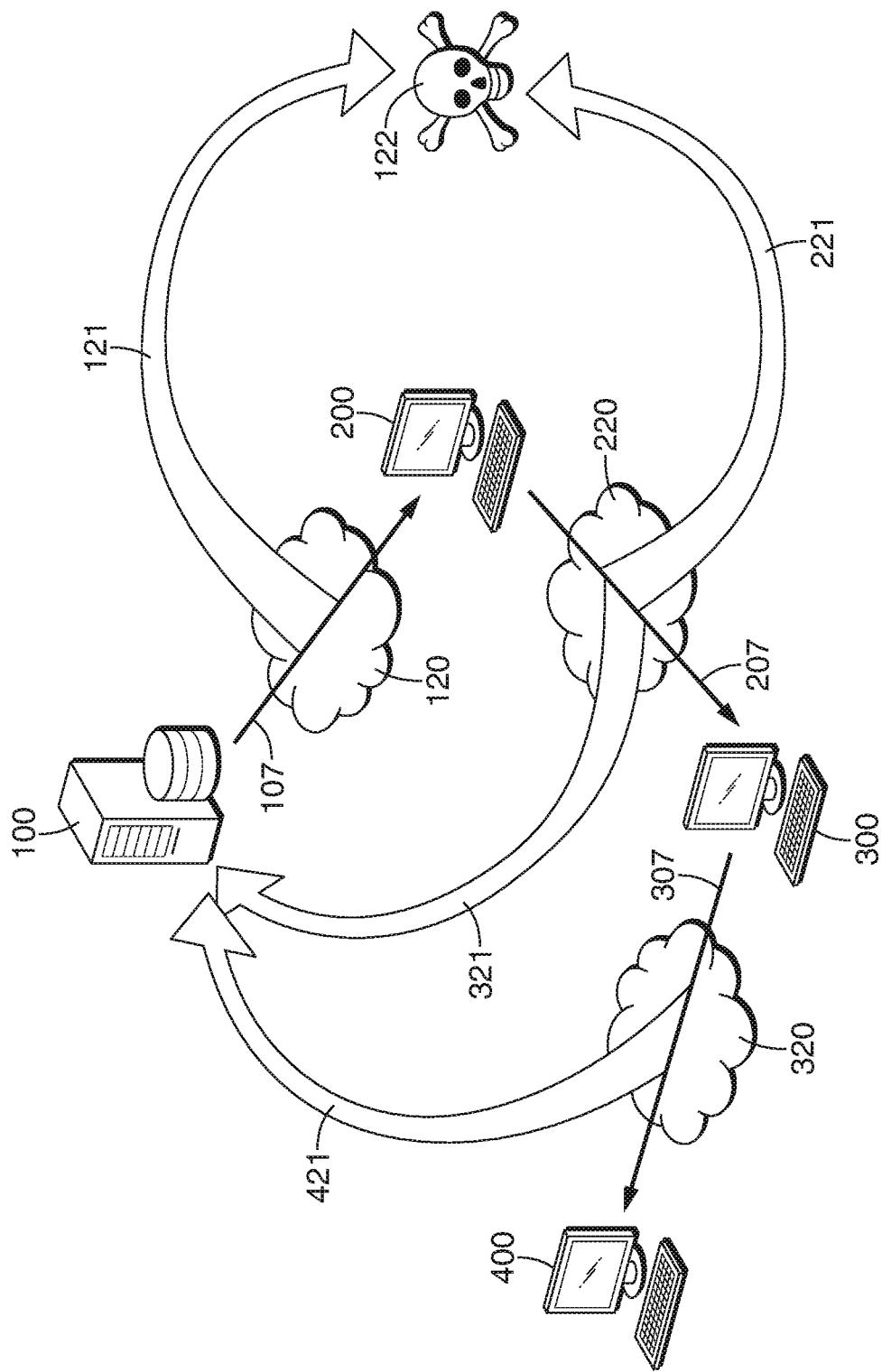
FIG. 2 is an illustrative second drawing illustrating perfect forward secrecy between a master entity and descendent entities.
Figure 3:
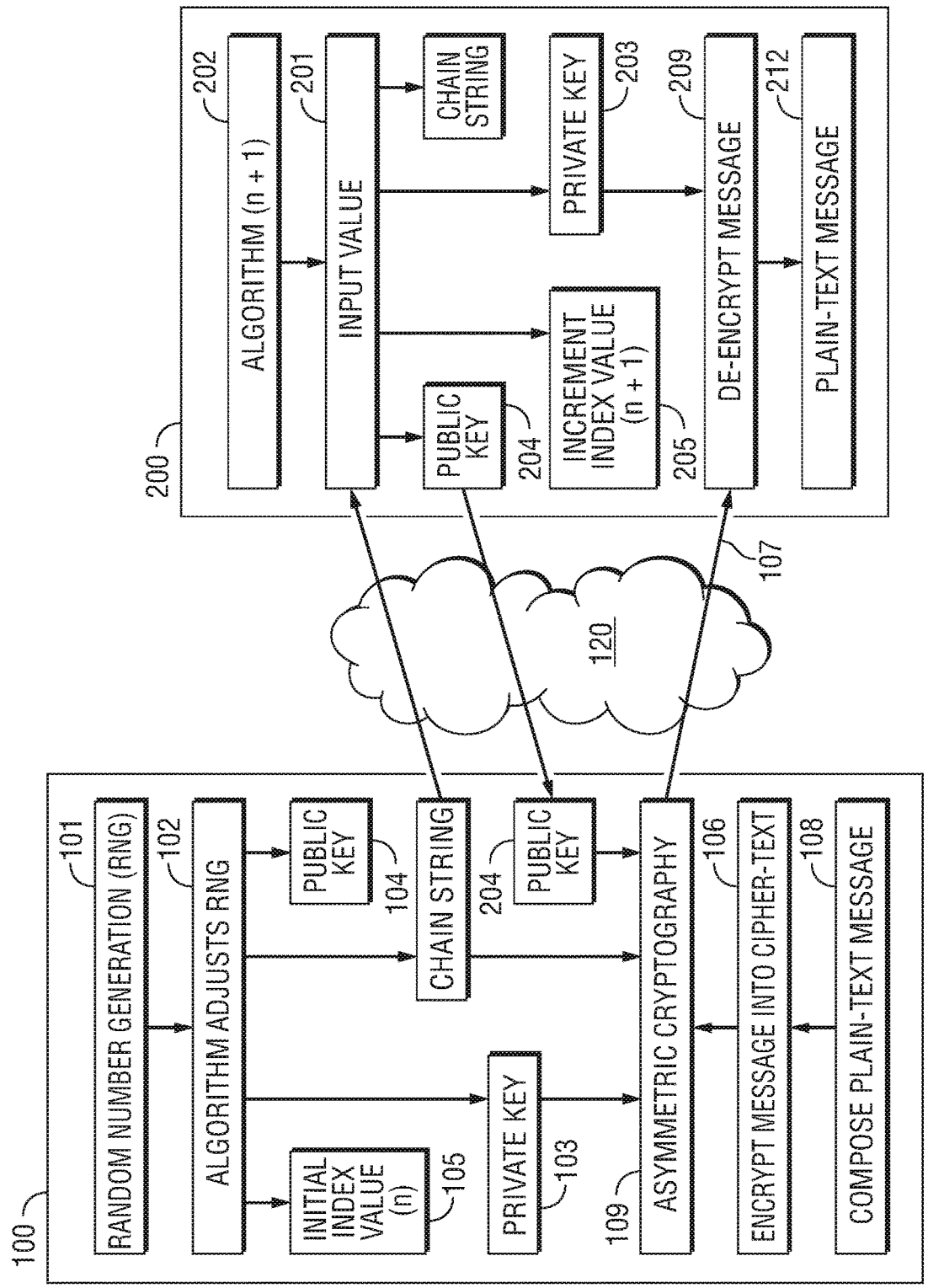
FIG. 3 is an illustrative third drawing illustrating perfect forward secrecy between a master entity and a child entity.
Figure 4:
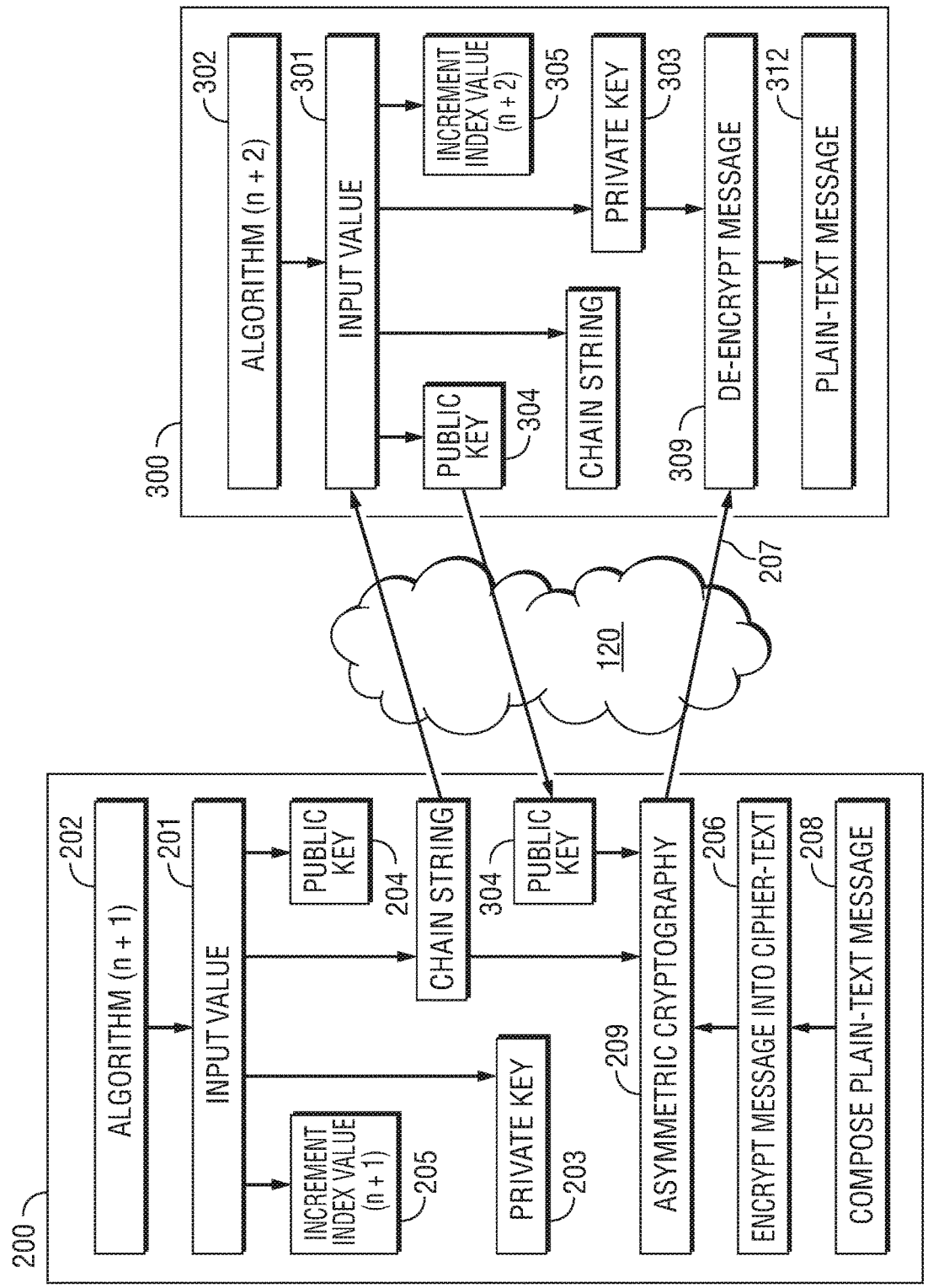
FIG. 4 is an illustrative fourth drawing illustrating perfect forward secrecy between a child entity and a grandchild entity.

As illustrated in FIG. 2, the use of a deterministic hierarchy to generate descendent keys allows a master entity (100) to authenticate and to determine both public keys and private keys that were generated by any of its descendants. The master entity (100) may be any device including a server (such as a real server, proxy server, . . . etc.). Processes performed within the master entity may be hardened and well defended via one or more of firewalls, antivirus software, disconnection from outside access, and the like. As illustrated in FIG. 3, those processes include creation of the seed such as by random number generation (101), algorithm adjustment of the random generated number (102), private key production (103), private key production (104), chain string production (111) and index value production (105). The master entity (101) may generate (108) and encrypt a message into cipher-text (106) and transmit (107) the cipher-text message along with a public key to child entity (200) (which may be a client in client-server context). The public key (104) is widely shared and is publicly accessible. Transmissions between the master entity (100) and child entity (200) may traverse an unsecure medium (120).

Within such an unsecure medium (120) a man-in-the-middle (121) interception of the transmission may occur. If the transmission (107) is encrypted, so long as the interceptor (122) cannot break the encryption, the transmission will remain unintelligible cipher-text. As a result, the communication remains secure. This is because the interceptor cannot de-encrypt transmissions without the private keys. Moreover, if the interceptor does not relay un-encrypted communications, the parties will know of the interception and will cease communicating leaving the interceptor with nothing but unintelligible cipher-text.

The child entity (200) contains a receiver (207), which may be a radio receiver, modem, or any other data input apparatus configured to receive (208) the encrypted communication from the transmission medium. Before receiving the transmission, the chain string (111) was positioned on the child entity (200). A child algorithm (202) operates on the chain string (111) and increments the index value (205). The child algorithm (202) and incremented index value (205) correspond to values within a data structure accessible by the master entity (100).

The child algorithm (202) operates on the chain string (111) offline to create a child-private key (203), a child-public key (204), an incremented index value (205), and a child chain string (211). The child-public and private keys may be created simultaneously or sequentially. The child-public key, child private key, and child chain string may all be data sets parsed from distinct strings of bytes derived from one or more outputs of the child-algorithm (202) operating on the chain string (111). One or more of the produced child-public key, child private key, child chain string, and index value may be concatenated with filler string to produce a data set of a desired length. The filler string may be generated by random number generation algorithm. The public key (204) may be widely shared, is publicly accessible, and the parent entity (100) receives it for use in asymmetrical cryptography.

The master entity (100) contains a data array associating the specific algorithm used at an instantiation equal to each specific index value. As a result, using the index value and its associated algorithm, along with the seed value, the master entity (100) can recreate the child-private key (203), child-public key, and child chain string (211). Both now having their own private and public keys, the master entity (100) and the child entity (200) can now share encrypted communication transmissions (107) and de-encrypt them (109, 209) into plain-text (212) via asymmetric cryptography. This master-child process may occur in parallel between the master entity (100) and numerous child entities, resulting in numerous sibling child-entities. Although none of the sibling entities can recreate each other's private keys, all of the child-sibling's private keys are known to the master entity (100).

In an embodiment, because the creation of public and private keys is accomplished with a deterministic hierarchy, a child-entity (200) may in turn access the communications of grandchildren or further descendants by re-creating the private keys of all entities that descend from any one specific entity. Each grandchild or further descended entity (300) contains a receiver, which may be a radio receiver, modem, or any other data input apparatus configured to receive (308) an encrypted communication from the child (or further descended) entity (200). Before receiving the transmission, a grandchild (or further descended) chain code (211) was positioned within the grandchild (or further descended) entity (300). The grandchild (or further descended) public key (304), private key (303), and chain code (311) may be generated on the grandchild (or further descended) entity (300) or on the child (or further descended) by operation of the algorithm on the received chain code (211). Each ancestor with access to both the proper algorithm and the chain string can recreate the private key (303) offline. Offline re-creation of the private key prevents exposing the private key to man-in-the-middle attack. This process can be repeated over one or any number of further sibling or levels of descendant entities (400).

In an embodiment, only the master entity (100) knows the algorithm for generating each descendent entity's private key. In an embodiment, only each ancestor entity knows the algorithm for generating each of its descendent entities' private keys. In an embodiment, an ancestor entity (other than the master entity) knows the algorithm for generating one, some, or all its descendent entities' private keys. For example, an ancestor entity (other than the master entity) may only know the algorithm for generating descendent entities' private keys up to or down from a specific depth of one or a specific number of generations, or the number of generations it knows may be related to what its breadth index value is (how many siblings it has), how many descendants it has at a given breadth or how many total descendants it has.

In an embodiment, because each algorithm relies upon successive applications of algorithms on successively generated chain strings, any break in knowledge of the generated chain string prevents further descended entities from being able to recreate their descendant's private keys. In an embodiment, there may be breaks such as if one or more ancestors who lacks access to the private key-generating algorithm precedes one or descendants who possess access to the private key-generating algorithm. For example, the algorithm may be configured to keep track of the index value of the entity accessing it and only output a descendant's private key if the index value matches a predetermined value (for example specific depth, breadth, . . . etc.). Also, an ancestor with access to the algorithm may transmit the chain strings and algorithms to a descendent without access to the algorithms thereby enabling the descendant to apply the algorithms to the chain strings and thereby generate private keys.

In an embodiment, asymmetric cryptography using a deterministic hierarchy facilitates passive inline session monitoring. This is accomplished by having the master entity or another algorithm knowing ancestor entity, intercept a communication transmission involving a descendant entity. This communication may be between two or more descendant entities or between one or more descendant entities and one or more third parties. Because the knowing ancestor has the algorithms, and the index values of the private key associated with the communication, the ancestor can re-generate the private key by replicating all the preceding algorithm operations on the seed value up to the index value. Once the private key has been re-generated, the ancestor can then de-encrypt all the intercepted communications. Such de-encryption facilitates true passive monitoring because the de-encryption occurs without any transmission whatsoever from the algorithm knowing ancestor to the recipient. In an embodiment, the passive inline session monitoring is accomplished by configuring the master entity as a proxy server between one or more descendent entities and an outside entity or between two or more descendent entities.

Such an arrangement allows for the simultaneous presence of true perfect forward secrecy with total passive session monitoring. Because none of the algorithms creating a private key are transmitted over an unsecure medium, because none of the communications can be de-encrypted without a private key, and because the private keys change for each communication session, perfect forward secrecy exists. Because however, the master entity (and possibly one or more descendant entities) can derive the private key using the encrypted private key and the index value, the master entity (and possibly one or more descendant entities) can passively monitor all communications made by entities to which it is an ancestor.

Moreover, this process is markedly superior to prior art approaches. Prior art approaches rely upon either a series of pre-created keys created on the master entity or rely upon re-use of the same keys over multiple communication sessions. As previously mentioned, if a new key is not used for each communication session, the repetition renders the keys vulnerable to brute force decoding. Pre-created keys also have their limitations.

Because pre-created keys are installed on devices prior to commencing communications, only a finite number of pre-created keys can be installed. This is undesirable because as each communication session commences, one of this finite number of keys is consumed. After a given number of communication sessions, the supply of keys will be exhausted. Moreover, if there are multiple descendent entities using pre-created keys, the supply may become exhausted quite rapidly. In fact, if the number of descendants grows large enough and they communicate enough, the master entity might not be able to do much more than perpetually generate keys just to keep up with the demand for new keys.

In addition, use of pre-created keys result in the inefficient deployment of system resources. This is because the production of large numbers of keys at one time by a single entity is by definition, (because it requires many iterations of one or more complex algorithms) resource intensive. As a result, because a resource intensive activity must be performed during communications, communications are slowed. In contrast, using a determinative hierarchy disperses the key production over many entities and only requires one iteration of a complex algorithm per communication session. In addition, because the keys are made by the key users, there is no need for the key users to wait for updates from the master entity before continuing to have communication sessions.

Figure 5:
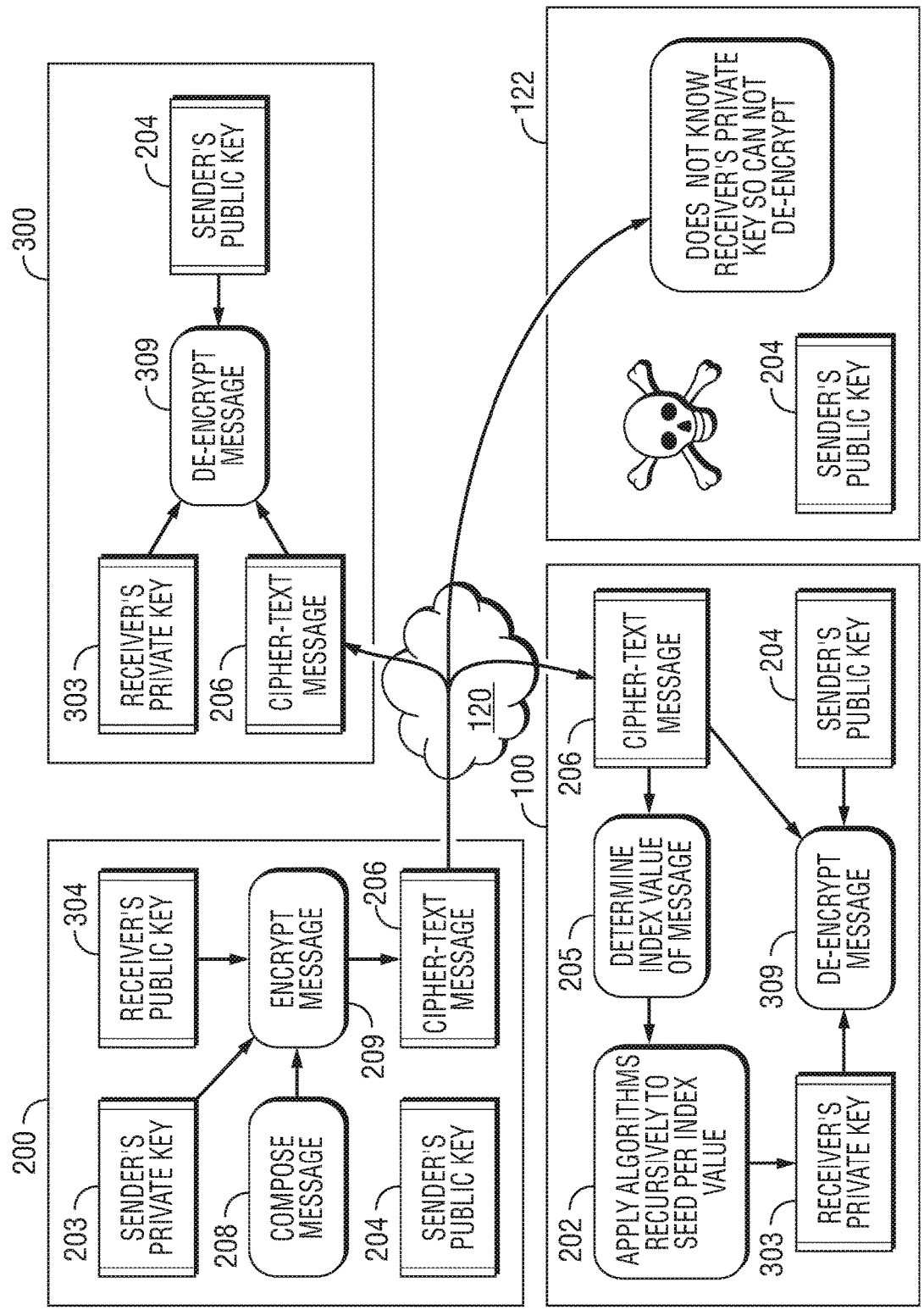
FIG. 5 is an illustrative fifth drawing illustrating perfect forward secrecy in the face of a man-in-the-middle attack.

FIG. 5 illustrates how the master entity (100) may implement inline passive monitoring while maintaining perfect forward secrecy. This may be either when the master entity (100) is intentionally configured to operate as a proxy server (as shown in FIG. 1) or when the master entity otherwise intercepts communications involving a descendent entity. A descendant entity, such as a child, is the sender (200) of a shared communication (207) over an unsecure medium (120) to a receiver (300) which may also be a descendant such as a grandchild, sibling, or other an outside entity. Using asymmetric cryptography, the sender (200) uses their private key (203) and the receiver's public key (304) to encrypt a composed message into cipher-text. The encoded message is transmitted into an unsecure medium (120) from which it is received by the receiver (300), the master entity (100), and possibly by an interceptor (122). The receiver uses the sender's public key (204) (which is publicly accessible) and their private key (303) (which never goes online) to de-encrypt the message offline.

The master entity (100) uses the sender's public key (204) and derives the receiver's private key offline. This is done by determining from the message or from another source what the index number is and then recursively applying, the appropriate algorithm(s) starting from the seed value and then using the resulting chain strings for the number of times due by the index value. After deriving the receiver's private key, because the master entity (100) now has both the receiver's private key and the sender's public key, the master entity can review the message without directly contacting either the sender nor the receiver. The interceptor however, at most only has access to the sender's public key so it cannot de-encrypt the message.

In an embodiment, after receiving and de-encrypting the message, the message instructs a processor configured with an actuator, to activate or deactivate a mechanical device. This includes but is not limited to locking or unlocking a lock, activating or deactivating a motor, inputting or draining a chemical in a reactor, activating a refrigerator, deactivating a refrigerator, printing a document, shredding a document, opening a door, closing a door, elevating an elevator, descending an elevator, illuminating a light source, de-illuminating a light source, and any combination thereof.

The message may comprise a confidential data set used for an authorization process. Such data sets may include but are not limited to data related to identity, finances, residency, citizenship, employment, credit history, health status, health history, genetics, mental health, predispositions, purchase history, group memberships, affiliations, associations, attendance patterns, travel patterns, communication patterns, location, security clearance, criminal records, number and/or type of transaction requests made, presence on various databases, and any combination thereof.

The message may comprise a data set used for validation of a unique identifier. These may include but are not limited to biometric data used by a fingerprint recognition program, voice recognition program, iris recognition program, DNA (deoxyribonucleic acid) recognition program, heartrate reader, blood-oxygen reader, MRI (magnetic resonance imager), biomarker scanners, and facial recognition program. Receipt and de-encryption of the message may cause activation or de-activation of one or more of such identifier using apparatuses.

Figure 6:
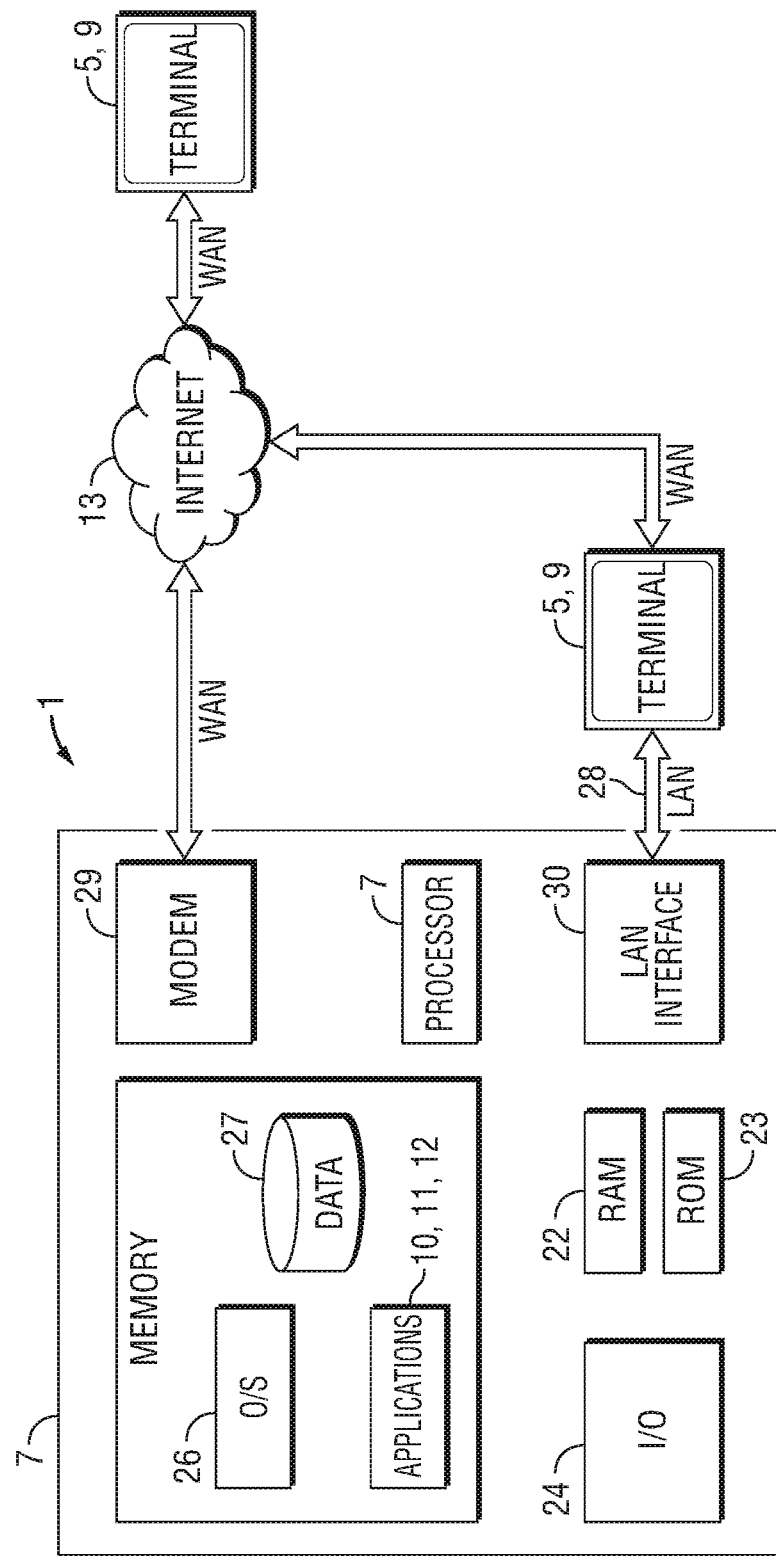
FIG. 6 is an illustrative sixth drawing illustrating software and hardware suitable for a master entity or other entities.

The master entity, child entity, grandchild entity, and any sibling, descendant, or ancestor entity, may comprise a computer system. As illustrated in FIG. 6, the computer system (1) may have a processor (7) for controlling the operation of associated components, and may include RAM (22), ROM (23), input/output modules (24) and a memory (25). The processor (7) may also execute all software running on the computer e.g., the operating system, consent applications (10, 11, 12), and authorization applications. Other components commonly used for computers such as EEPROM or Flash memory or any other suitable components may also be part of the computer system.

The memory of the computer system may be comprised of any suitable permanent storage technology—e.g., a hard drive or cloud based storage. The memory stores software, including the operating system of any application(s), along with any data (27) needed for the operation of the computer system. Alternatively, some or all of computer executable instructions may be embodied in hardware or firmware. The computer executes the instructions embodied by the software to perform various functions.

The computer system may be connected to other computer systems via a local area network (LAN) (28), a wide area network (WAN) (29), or other network arrangement. The system may operate in a networked environment supporting connections to one or more remote computers, such as terminals (5, 9), personal computers, or servers that include many or all of the elements described above relative to system. The network may be interconnected via adaptors, modems (29), interfaces (30) or other communication medium including the internet (13).

It will be appreciated that any known network connections or other means of establishing a communications link between the computers may be used. The existence of any of various well-known protocols such as TCP/IP, Ethernet, FTP, HTTP and the like is presumed, and the system can be operated in a client-server configuration to permit a user to retrieve applications such as web pages from a web-based server. Any of various conventional web browsers can be used to display and manipulate data on web pages.

The computer system may also include one or more of the following components: I/O circuitry, which may include a transmitter device and a receiver device and may interface with fiber optic cable, coaxial cable, telephone lines, wireless devices, PHY layer hardware, a keypad/display control device or any other suitable encoded media or devices; peripheral devices, which may include counter timers, real-time timers, power-on reset generators or any other suitable peripheral devices; logical processing device, which may compute data structural information, structural parameters of the directed graph and/or language model and machine-readable memory. Components of the computer system may be coupled together by a system bus or other interconnections and may be present on one or more circuit boards. In some embodiments, the components may be integrated into a single chip. The chip may be silicon-based.

While this invention may be embodied in many different forms, there are described in detail herein specific preferred embodiments of the invention. The present disclosure is an exemplification of the principles of the invention and is not intended to limit the invention to the particular embodiments illustrated. All patents mentioned herein or mentioned, are incorporated by reference in their entirety. Furthermore, the invention encompasses any possible combination of some or all of the various embodiments described herein and/or incorporated herein. In addition, the invention encompasses any possible combination that also specifically excludes any one or some of the various embodiments described herein and/or incorporated herein.

The above disclosure is intended to be illustrative and not exhaustive. This description will suggest, many variations and alternatives to one of ordinary skill in this art. All the alternatives and variations are intended to be included within the scope of the claims where the term "comprising" means "including, but not limited to". Those familiar with the art may recognize other equivalents to the specific embodiments described herein which equivalents are also intended to be encompassed by the claims.

Those skilled in the art may recognize other equivalents to the specific embodiment described herein which equivalents are intended to be encompassed by the claims attached hereto.

What is claimed is:

1. A data processing system for perfect forward secrecy, the system comprising:
  a plurality of devices, a first device of the plurality of devices being a master device, all other of the plurality of devices being descendent devices,
  the descendant devices each configured to:
  receive a first chain string cipher-text from its immediate ancestor device;
  generate a private key, a public key, and a second chain string cipher-text;
  increment an index value, by applying a pre-installed algorithm to the received first chain string cipher-text; and
  transmit communications configured for encryption and de-encryption via asymmetric cryptography over an unsecure medium;
  wherein the asymmetric cryptography utilizes public keys and incremented index values which are transmitted over the unsecure medium within the transmitted communications and private keys which are not transmitted over the unsecure medium;
  wherein the incremented index value is embedded within the generated second chain string cipher-text;
  the master device is ancestor to all the descendent devices and is configured to:
  apply a first algorithm to a seed value to generate a master private key, a master public key, an initial index value, and a primary chain string cipher-text;
  embed the initial index value within the primary chain string cipher-text;

transmit the primary chain string cipher-text to a descendant entity;
intercept a communication over an unsecure medium transmitted by a transmitting descendent entity;
recreate the private key of the transmitting descendent; and
passively de-encrypt the intercepted communication with the recreated private key;
the private key of the transmitting descendent entity is recreated by:
retrieving the incremented index value from the communication,
retrieving from a data structure every algorithm associated with index values ranging from the initial index value up to the retrieved index value; and
recursively applying each of the retrieved algorithms to the seed value.

2. The system of claim 1 wherein the index value is embedded within the first chain string cipher-text.

3. The system of claim 1 wherein the first chain string cipher-text is installed on the descendent entity via transmission over an unsecure medium.

4. The system of claim 1 wherein the seed value is created with a random number generator.

5. The system of claim 1 wherein the seed value is created with a random number generator selected from the group consisting of: Blum Blum Shub, Blum-Micali algorithm, Complementary-multiply-with-carry, Counter-based random number generator (CBRNG), Inversive congruential generator, ISAAC (cipher), KISS (algorithm), Lagged Fibonacci generator, Linear congruential generator—of historical importance, Linear feedback shift register, Maximal periodic reciprocals, Mersenne Twister, Middle-square method, MIXMAX generator, Multiply-with-carry, Naor-Reingold pseudorandom function, Park-Miller random number generator, PCG, RC4 PRGA, Rule 30, Well equidistributed long-period linear, Wichmann-Hill, Xorshift, Xoroshiro128+, Yarrow, Hardware (true) random number generators (TRNGs), Block ciphers in counter mode, Cryptographic hash function, Stream ciphers, PRNG APIs, Random class in the .NET Framework, Random class in the Java programming language, SecureRandom class in the Java programming language, Random module in the Haskell 98 specifications, Web Crypto API for web browsers, Random number generators that use external entropy, TRaNGen2—Microsoft Windows, CryptGenRandom—Microsoft Windows, Fortuna, Yarrow—Mac OS X and FreeBSD, /dev/random—Linux and Unix, LavaRnd, Lavarand, and any combination thereof.

6. The system of claim 1 wherein the algorithm is one item selected from the group consisting of: SHA-224, SHA-256, SHA-384, SHA-512, a hash function, a block cipher routine, implementing an XOR function or a more detailed secret key encryption algorithm, such as Data Encryption Standard (DES), Triple-DES (3DES), DESX, Advanced Encryption Standard (AES), CAST-128, CAST-256, International Data Encryption Algorithm (IDEA), Rivest Ciphers 1-6 (RC1-RC-6), Blowfish, Twofish, Camellia, MISTY1, Secure And Fast Encryption Routine (SAFER), KASUMI, SEED, Skipjack, RSA, Diffie-Hellman key exchange, Digital Signature Algorithm (DSA), ElGamel, Elliptical Curve Crptography (ECC), Public-Key Crytography Standards (PKCS), Cramer-Shoup, Key Exchange Algorithm (KEA), LUC, and any combination thereof.

7. The system of claim 1 wherein the data structure is one item selected from the group consisting of: a list, array, associative array, multimap, set, bag, multiset, stack, queue, double ended queue, priority queue, tree, graph, and any combination thereof.

8. The system of claim 1 wherein the algorithm produces hash text.

9. The system of claim 1 wherein the public and private keys are strings parsed from different sections of a hash generated by the algorithm.

10. The system of claim 1 wherein the index value comprises data corresponding to how many ancestor devices the generating device has.

11. The system of claim 1 wherein the index value comprises data corresponding to how many devices with equal numbers of ancestor devices the generating device has.

12. The system of claim 1 wherein the master device is further configured to transmit communications over an unsecure medium via asymmetric cryptography using the recreated public and private keys.

13. A method of communicating with perfect forward secrecy, the method comprising:
on a master device:
randomly generating a seed value;
creating a hash string by operating on the seed value with a SHA512 algorithm;
parsing a first 256 bits of the hash string to define a parent chain string;
parsing a second 256 bits of the hash string to define a master private key and a public key; and
creating an initial index value;
on a second device, descendent from the master device:
receiving a chain string and an index value from a device immediately ancestral to the second device, the chain string and the index value being the respective parent chain string or a chain string descended therefrom and initial index value or an index value descended therefrom;
creating a descendant hash string by operating on the received chain string with the SHA512 algorithm;
parsing a first 256 bits of the descendant hash string to define a transmitted chain string;
parsing a first portion of a second 256 bits of the descendant hash string and a second portion of the second 256 bits of the descendant hash string to define, respectively, a private key and the public key;
incrementing the index value;
optionally transmitting the transmitted hash string and incremented an index value to a device immediately descendant to the second device; and
on a descendant device communicating over an unsecure medium via asymmetric cryptography wherein the public key and incremented index value accompany communication over the unsecure medium and the private key and the master private key are de-encrypting the communication offline;
wherein the master device de-encrypts the communication of the descendant device by recursively applying the SHA512 algorithm and appropriately parsing off keys from the seed value for a number of times equal to the incremented index value of the communication.

14. The method of claim 13 in which the first and second 256 bits are each a different character string beginning from a point equal to a bit location displaced from the end or beginning of the hash string selected from the range of 0 to 100% of the hash string length, and wrapping around again to the beginning of the hash string if the distance from the bit location to the end of the hash string is less than 256 bits.

15. The method of claim 13 in which the master device is a Transport Layer Security (TLS) server.

16. The method of claim 13 in which at least one device is a client device of a client-server network architecture.

17. The method of claim 13 in which the index value is a string with a length of at least 32 bits.

* * * * *